(12) United States Patent
Sinha (10) Patent No.: US 7,369,557 B1
(45) Date of Patent: May 6, 2008

(54) DISTRIBUTION OF FLOWS IN A FLOW-BASED MULTI-PROCESSOR SYSTEM

(75) Inventor: Amit Sinha, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 737 days.

(21) Appl. No.: 10/861,012

(22) Filed: Jun. 3, 2004

(51) Int. Cl.
  *H04L 12/56* (2006.01)

(52) U.S. Cl. .................................................... 370/392

(58) Field of Classification Search .................... None
  See application file for complete search history.

(56) References Cited

U.S. PATENT DOCUMENTS

| | | | |
|---|---|---|---|
| 6,091,725 A | 7/2000 | Cheriton et al. | |
| 6,111,877 A | 8/2000 | Wilford et al. | |
| 6,243,667 B1 | 6/2001 | Kerr et al. | |
| 6,308,148 B1 | 10/2001 | Bruins et al. | |
| 6,590,894 B1 | 7/2003 | Kerr et al. | |
| 6,603,765 B1 | 8/2003 | Wilford et al. | |
| 6,650,640 B1 * | 11/2003 | Muller et al. | 370/392 |
| 7,020,153 B2 * | 3/2006 | Droz et al. | 370/428 |
| 7,215,641 B1 * | 5/2007 | Bechtolsheim et al. | 370/235 |
| 7,248,585 B2 * | 7/2007 | Kohn et al. | 370/392 |
| 7,254,639 B1 * | 8/2007 | Siegel et al. | 370/389 |
| 2004/0030745 A1 * | 2/2004 | Boucher et al. | 709/203 |
| 2004/0125799 A1 * | 7/2004 | Buer | 370/389 |
| 2004/0190526 A1 * | 9/2004 | Kumar et al. | 370/395.21 |
| 2005/0074001 A1 * | 4/2005 | Mattes et al. | 370/389 |
| 2005/0152354 A1 * | 7/2005 | Abel et al. | 370/389 |

OTHER PUBLICATIONS

Li Fan, et al., "Summary Cache: A Scalable Wide-Area Web Cache Sharing Protocol," IEEE/ACM Transactions on Networking, vol. 8, No. 3, Jun. 2000, pp. 281-293.

* cited by examiner

*Primary Examiner*—Anh-Vu H. Ly
(74) *Attorney, Agent, or Firm*—Charles E. Krueger (57) ABSTRACT

A flow distribution technique associates probabilistic data structure with each processor of a multi-processor system that is used to determine whether a received packet is included in a flow assigned to the associated processor. A set of tuples of a received packet is processed by multiple hash functions to generate a set of values utilized as indices to search for hits of the probabilistic data structures. Only those flows having hashed indices that hit more than one probabilistic data structure are saved in a collision flow table. The probabilistic data structure require much less memory space than a flow table and can be designed so that the frequency of collisions is very low thereby requiring a small amount of memory for the collision flow table.

22 Claims, 5 Drawing Sheets

PRIOR ART

FIG. 1

PRIOR ART

DISTRIBUTION OF FLOWS IN A FLOW-BASED MULTI-PROCESSOR SYSTEM

BACKGROUND OF THE INVENTION

With the growing need for network bandwidth and increasing complexity of the services provided by a Routing and Services system, the demand for processing power in a networking system has grown to a point where a single processor can no longer support the full network load. To scale the throughput of the system, Routing and Services systems consisting of multiple processors generally use a packet distribution unit to load balance network traffic among the processors.

Figure 1:
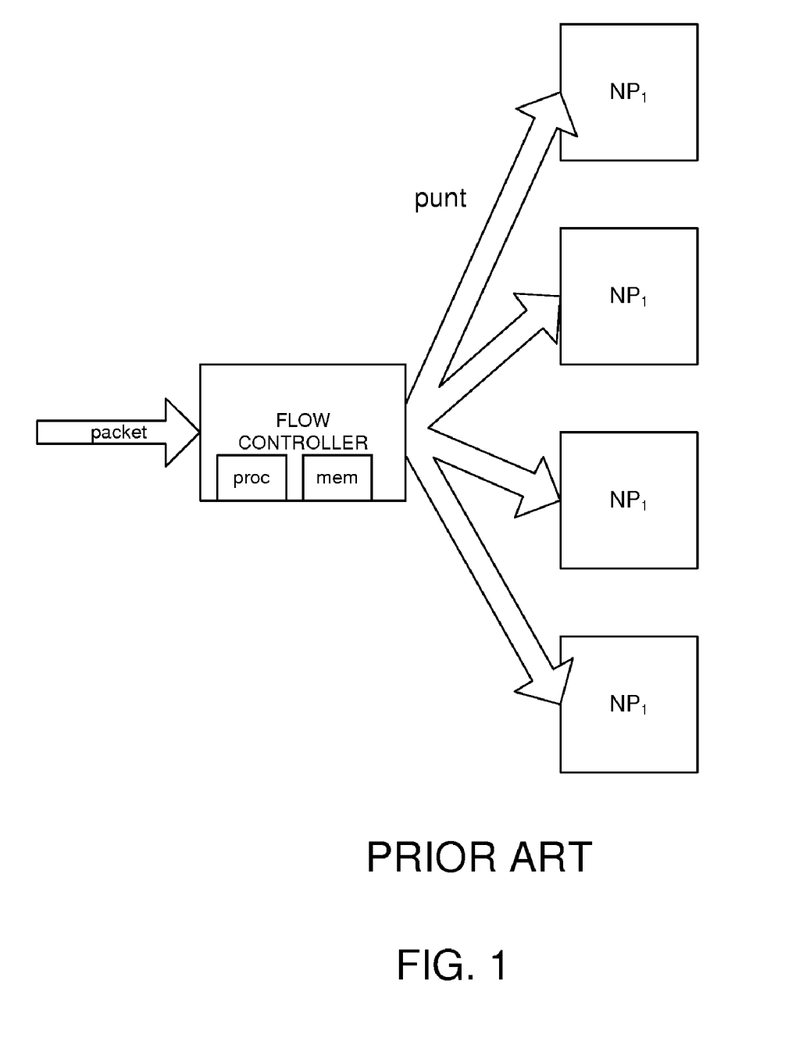
FIG. 1 is a block diagram of a standard flow control unit.

If the services provided by a networking system requires it to maintain state of a flow across packets, a flow state is created during the processing of the first packet of the flow and the state is saved in the RAM for subsequent packets. After the flow is terminated and no more packets are expected for this flow, the memory space occupied by the flow state in the RAM is freed up. A distributed memory multi-processor system that maintains per flow state often requires all packets in a flow to get processed by the same processor. A processor of the flow is chosen during the processing of the first packet of the flow and from there on all subsequent packets gets punted to this processor. For a system consisting of multiple processors, a flow distribution unit, as depicted in FIG. 1, is therefore required that can uniquely identify the processor of a network packet and direct this packet to the assigned processor in a flow preserving manner.

A flow is a sequence of packets being transferred between two endpoints, generally representing a single session using a known protocol. Accordingly, a flow is identified by a set of defined tuples and, for routing purpose, a flow is identified by the two tuples that identify the endpoints, i.e., the source and destination addresses. For content based services (Load balancer, firewall, Intrusion detection system etc.), flows can be discriminated at a finer granularity by using five or more tuples {Source address, destination address, IP protocol, transport layer source port, and destination port}. Each packet in a flow is expected to have the same set of tuples in the packet header.

Flows are further described in detail in the following patent applications:

U.S. Pat. No. 6,091,725, titled "Method For Traffic Management, Traffic Prioritization, Access Control, and Packet Forwarding in a Datagram Computer Network", filed Dec. 29, 1995, in the name of inventor David R. Cheriton and Andreas V. Bechtolsheim, assigned to Cisco Technology, Inc.;

U.S. Pat. No. 6,590,894, titled "Network Flow Switching and Flow Data Export", filed May 28, 1996, in the name of inventors Darren Kerr and Barry Bruins, and assigned to Cisco Technology, Inc.;

U.S. Pat. No. 6,308,148, titled "Network Flow Switching and Flow Data Export", filed Dec. 20, 1996, in the name of inventors Darren Kerr and Barry Bruins, assigned to Cisco Technology, Inc.; and U.S. Pat. No. 6,243,677, titled "Network Flow Switching and Flow Data Export", filed Jul. 2, 1997, in the name of inventors Darren Kerr, and Barry Bruins, assigned to Cisco Technology, Inc.

Each of these applications is hereby incorporated by reference for all purposes.

Figure 2:
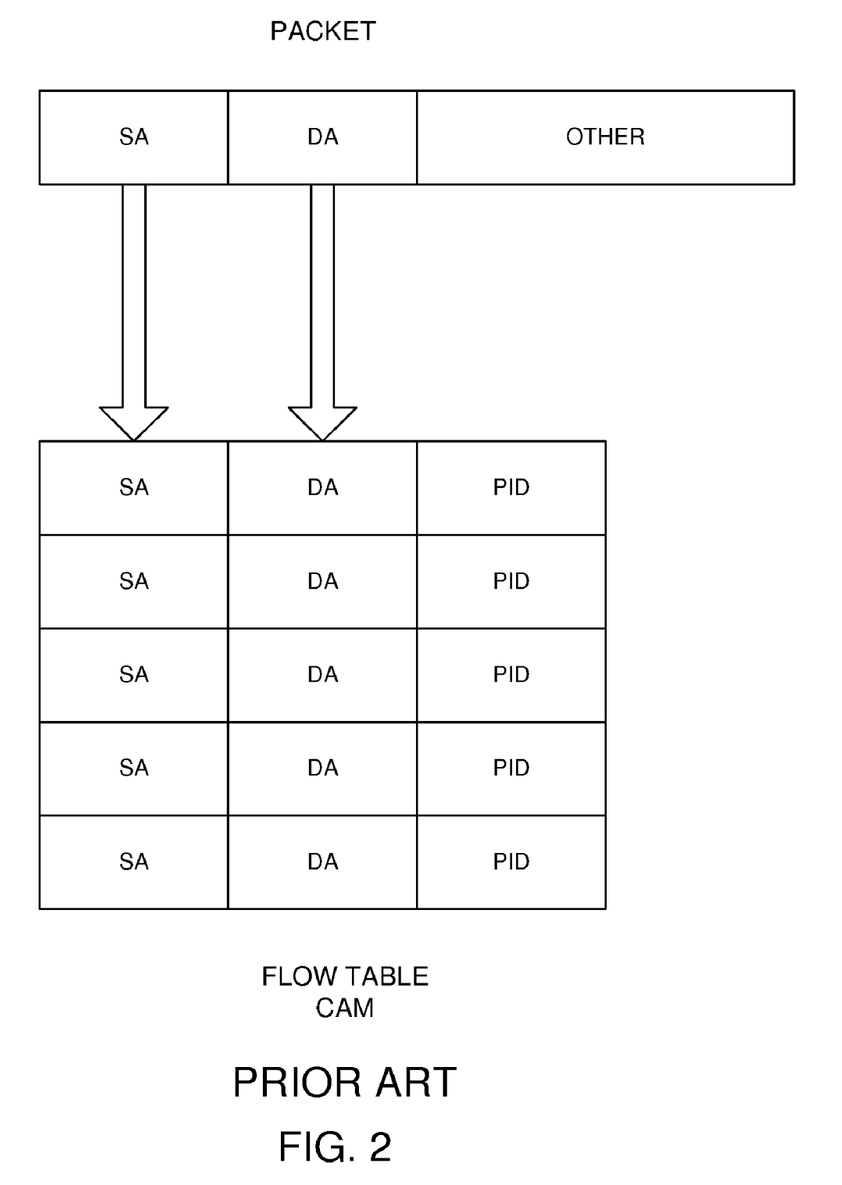
FIG. 2 is a block diagram of a standard flow table.

To load balance multiple processors in a flow preserving manner, some existing flow distribution units maintain a flow table that is an aggregate of flows serviced by all the processors within the system. FIG. 2 is a diagram depicting this type of system. The tuple information for each flow and a processor ID of the processor handling the flow form an entry of the table. When a packet is received, the flow table is searched to match an entry of the flow table with the tuples of the received packet. If an entry is matched then the processor ID of the processor handling flow is output. Content Addressable Memories (CAMs) and Static Random Access Memories (SRAMs) are often utilized to maintain the flow tables. However, this approach does not scale well for systems with a large number of processors as with a large number of flows, the required memory size for this type of flow table becomes excessive. Also an excessive number of chips, high power dissipation, and high cost make the approach impractical.

Some other flow distribution unit uses a mechanism that performs a hashing function on some of the tuples of the packet to produce indicia. The complete hash range is divided into multiple segments and a processor is assigned to each segment. Based on the hash result, the segment is identified and the packet is punted to the processor tied to that segment. These type of systems are described in:

U.S. application Ser. No. 09/053,237 titled "Router/Service processor scalability via Flow-based distribution of traffic", filed Apr. 1, 1998, in the name of inventor Earl Cohen, assigned to Cisco technology, Inc.;

U.S. Pat. Nos. 6,111,877, filed Dec. 31, 1997 and 6,603,765, filed Jul. 21, 2000, each titled "Load Sharing Across Flows", in the name of inventors Bruce A. Wilford and Thomas Dejanovic, assigned to Cisco Technology, Inc.

U.S. Pat. No. 6,175,874 titled "Packet relay control method packet relay device and program memory medium", filed Feb. 9, 1998, in the name of Imai; Yuji (Kawasaki, JP); Kishimoto; Mitsuhiro (Shinjuku, JP); Katsuyama; Tsuneo (Machida, JP), assigned to Fujitsu Limited.

Each of these applications is hereby incorporated by reference for all purposes.

A stateless hash based mechanism has a few drawbacks. Since the indicia produced by applying hash function on the tuples of the packet solely determines the processor, if the tuples are different on the two network sides of this system, packets from the either sides may get processed by different processors. Having different set of tuples for the two network sides of the system is a common scenario for systems providing NAT and NAPT service, which is described in RFC 3022, located on the "rfc-archive.org" website with the extension "/getrfc.rfc=3022". A hash-based mechanism also fails to identify related flows of a flow as the tuple that form the hash key may be different for the related flows. A FTP control and FTP data flows are related flows, and some systems require such flows to get processed by the same processor.

Another type of flow distribution unit punts packets to processors in a daisy-chaining manner until the packets find its assigned processors. This approach is also not scalable for large number of processors.

Accordingly, improved techniques for routing flows between multiple processors that scale well as the number of processors is increased is required in the field.

BRIEF SUMMARY OF THE INVENTION

In a first embodiment of the invention, probabilistic data structures are associated with each processor of multi-processor system. Each flow is programmed as a set of asserted bits, identified by a set of indices, in a bit vector included in the probabilistic data structure. The tuples of a received packet are processed to generate a set of hash values that are used as indices to determine whether the received packet hits one of the probabilistic data structures. A single hit indicates that the packet is part of a flow assigned to the processor associated with the probabilistic data structure that is hit.

In another embodiment of the invention, a new flow that doesn't hit any probabilistic data structure is assigned to a particular processor and the probabilistic data structure associated with that particular processor is programmed as a set of asserted bits based on the hash values for tuples in the new flow In another embodiment of the invention, flows that obtain hits from multiple probabilistic data structures have their tuples stored in a collision flow table that identifies the processor assigned to that flow.

In another embodiment of the invention, if a flow obtains hits from multiple probabilistic data structures and is not stored in the collision flow table it is treated as a new flow.

In another embodiment of the invention the probabilistic data structure is a Bloom filter.

In another embodiment of the invention, flows are removed by counting the number of flows that have set a particular bit in the Bloom filter and clearing the particular bit when the count is equal to zero.

Other features and advantages of the invention will be apparent in view of the following detailed description and appended drawings.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

One embodiment of the invention, a flow distribution unit utilizes a hash algorithm to reduce the number of bits needed to identify the flow to which a packet belongs. The hash results for each flow form a set of hash flow results. A probabilistic data structure is associated with each processor in a multiprocessor environment and is used to determine whether a hash flow result of a particular packet identifies a flow that is being processed by the associated processor.

As is known in the art, a problem with using a hashing technique is that the hash result of distinct tuples in a packet may be the same. This is known as a collision. In this embodiment, a collision flow table contains only entries for those elements that collide. As will be demonstrated below, the design of probabilistic structures is such that the frequency of collisions can be made very small so that the size of the collision flow table is small. Further, the memory requirements for storing the probabilistic structures are much less than for storing the aggregate flow table of all the flows. Thus, the system scales well as the number of processors increases.

One embodiment of invention includes a flow distribution unit for a multiprocessor system that uses probabilistic structures in the form of Bloom filters and a false positive elimination unit to identify the processor of a network packet. If the flows serviced by a processor generate unique hashes from flows serviced by all other processors then storing these unique hashes of flows serviced by each of the processor is sufficient information for the flow distribution unit to identify the processor of a packet. These unique hashes for a processor are stored in the Bloom filters.

In case the hashes are not unique for some flows, those flows are identified as colliding flows. A success for membership query of such flows is termed as false positive. A false positive elimination unit maintains a collision flow table for flows producing hash collisions among multiple Bloom filters. By keeping only the colliding flows in a collision flow table, a Bloom filter based mechanism thus significantly reduces the memory requirements of the flow distribution unit. This embodiment therefore provides a mechanism for a significant scale up in handling a number of concurrent flows in a flow-based, multi-processor system.

Thus, instead of storing the complete tuple information, multiple hashes for the tuples of a flow are calculated and only these hashes are then stored in Bloom filters. A Bloom filter is a probabilistic data structure where the probability that two different set of tuples produce all the same hashes is minimal. In the case where two flows processed on two different processors produce the same hash results, they both get stored in a collision flow table. Since the chances of collision are low, the memory requirement for this collision flow table is only a small percentage of the size of the full flow table.

For a multi processor system, the flow distribution unit maintains a Bloom filter for each of the processors. While performing the membership query, a lookup is performed in all the filters. If a unique match occurs in one of the Bloom filters, the packet is punted to the corresponding processor. If a match occurs in multiple Bloom filters, the packet is forwarded to the false positive elimination unit. This unit maintains a collision flow table for all the colliding flows and a lookup in this table determines the processor of the packet. In case the membership query fails for all the processors, this packet is treated as a packet for a new flow.

An overview of the Bloom filter will now be provided. A Bloom filter is a compact probabilistic data structure which is commonly used to determine if an element might be part of a set. A Bloom filter query may return true for elements that are not actually in the set (false-positive), but will never return false for elements that are in the set. Bloom filters are implemented using a large bit vector with m bits. For an empty set, all bits of the Bloom filters are unset. If the set E is non-empty, k bits are set for each element e in the set. The indices of these k bits are obtained using k hash functions H(i), i=1, ..., k.

Querying the filter for set membership of a given element e is similar to the programming process. Given element e, k hash values are generated using the same hash functions used to program the filter. The bits in the m-bit long vector at the locations having indices corresponding to the k hash values are checked. If at least one of the k bits is 0, then the element is declared to be a non-member of the set. If all the bits are found to be 1, then the element is said to belong to the set with a certain probability. The false positive rate for Bloom filters depend on three parameters, the bit vector size m, the number of elements in the set n and the number of hash functions k. The size of the required collision table can be reduced by controlling the size of these parameter.

For large value of m, the false positive rate is: f=(1−exp(−nk/m))pow(k).

In order to reduce the false positive rate, the above formula reveals that the size of the bit-vector, m, needs to be quite large compared to the size of the element set, n. For a given ratio of m/n, the false positive probability can be reduced by increasing the number of hash functions, k. For an m/n ratio of 9 (9 bits for each element), and with six hash functions (k=6), the false positive rate is close to 0.0133.

As shown in the calculations above, with six hash functions and a million concurrent flows per processor, a Bloom filter of size ~1.2 Mbytes per processor produces a false positive rate of 0.0133. Thus the required memory size of this collision flow table is only 1.33% of the total memory required to store aggregate flows. The Bloom filter size is independent of the size of a flow. For flows of larger size, the reduction in memory usage is thus more significant.

The details of Bloom filter is described by B. Bloom, in his paper "*Space/time trade-offs in hash coding with allowable errors*," Commun. ACM, vol. 13, no. 7, pp. 422-426, July 1970, and the paper by Cao et. al., "*Summary Cache: A Scalable Wide-Area Web Cache Sharing Protocol*", IEEE/ACM TRANSACTIONS ON NETWORKING, VOL. 8, NO. 3, pp. 281-293, June 2000, which are hereby incorporated by reference.

To further scale a system with large number of processors, the collision flow table can be distributed among multiple processors. A Bloom filter can be divided into small logical buckets and the collision flow tables for these buckets can be distributed on multiple processors.

Figure 3:
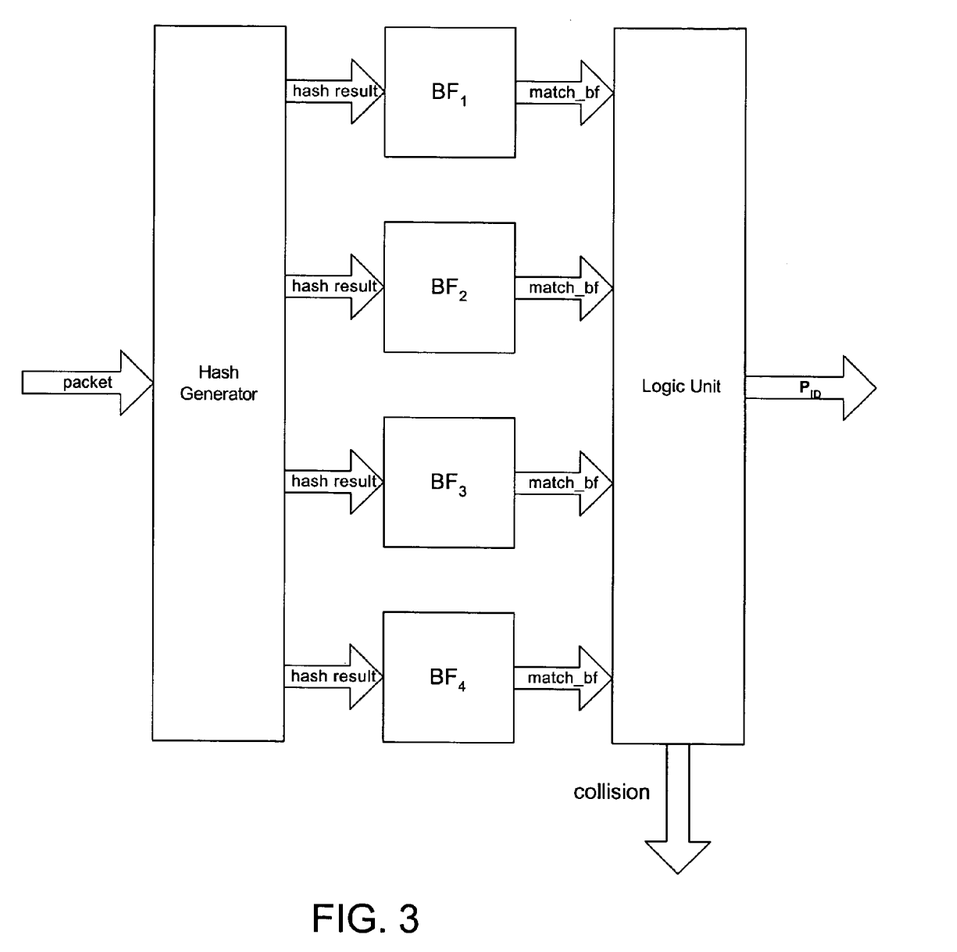
FIG. 3 is a block diagram of an embodiment of the invention.
Figure 4:
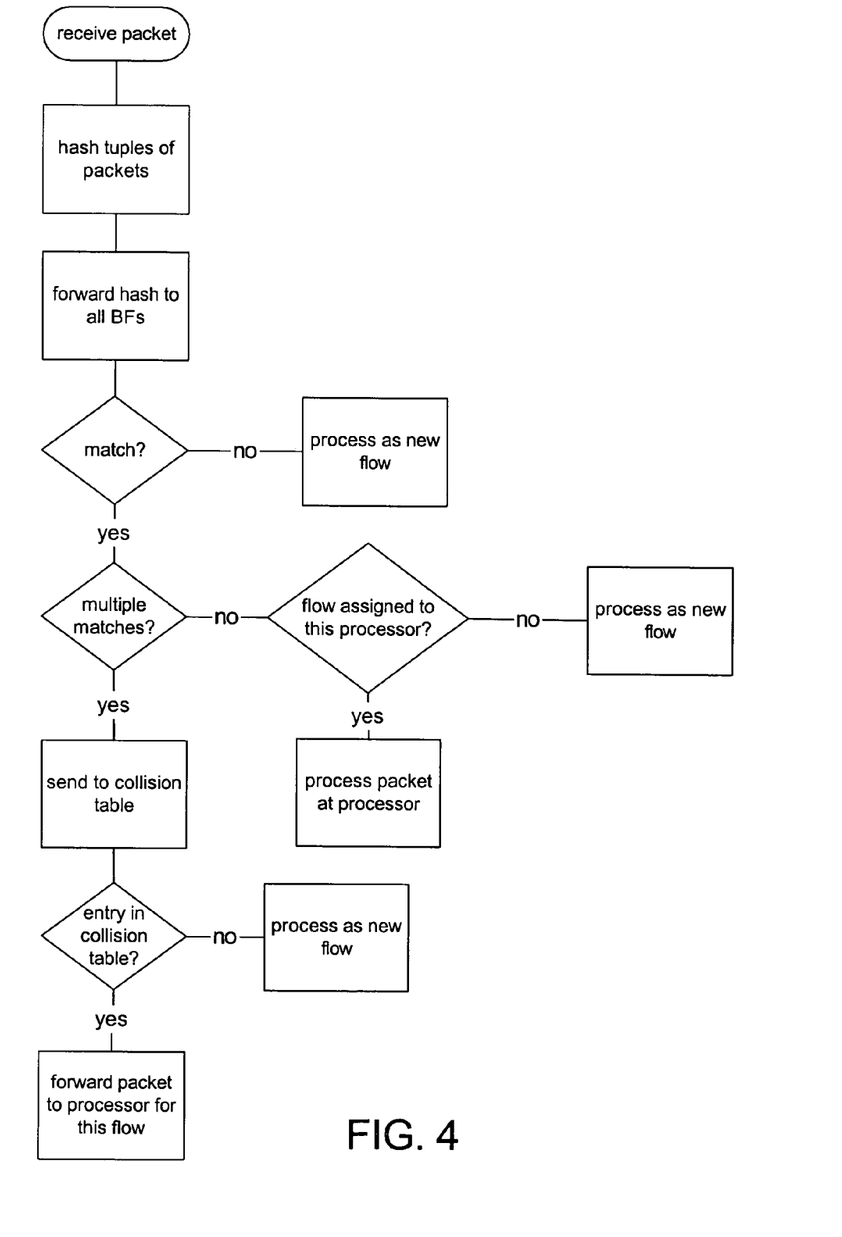
FIG. 4 is flow chart depicting operations performed by and embodiment of the invention.

A more detailed description of the embodiment will now be provided with reference to the block diagram of FIG. 3 and the flow chart of FIG. 4.

FIG. 3 is a block diagram depicting an embodiment of a flow distribution unit. A packet is received at the flow distribution unit and forwarded to the hash generator which operates on the tuples of the packet to generate a k-bit hash result which is provided in parallel to the inputs of a set of Bloom filters. If the k-bit hash indices select all bits in Bloom filter which are set then the match_bf for that Bloom filter is asserted. As described above each Bloom filter is associated with a unique processor in the multi-processor environment.

The match_bf signals are provided in parallel to a logic unit which identifies the processor handling the flow if only one match_bf signal is asserted. If more than one match_bf signal is asserted the collision signal is generated and the packet is processed using the false positive elimination unit.

When the first packet of a flow is received the flow control unit must assign the flow to one of the processors. Various techniques for distributing flows are known in the art and are not part of this invention. The technique for detecting a new flow in the presently described embodiment will now be described.

At the flow distribution unit, before installing the new flow in the Bloom filter of a processor, a query is performed in the Bloom filters for all other processors. For the first packet of a new flow there are two possible results: 1) there will be a match from none of the Bloom filter indicating unambiguously that the flow currently being processed is a new flow; or 2) a false positive is received from one or more of the Bloom filters.

In case 1) above, for a packet of a new flow, the lookup may fail for Bloom filters of all the processors. Based on the policy to distribute load (round robin, least loaded or some other policy), the packet is punted to one of the processors. Defining a policy to determine where to punt the first packet of a flow is outside the scope of this invention.

In case 2) above, a packet for a new flow may also result in a lookup success in one or more Bloom filters. If the lookup succeeds in multiple Bloom filters, i.e., the collision set is non-empty, the collision flow table can determine this packet as a packet for a new connection because there will be no entry in the collision flow table for this packet.

In the case where the lookup succeeds in only one Bloom filter of processor n, i.e., the collision set is empty, the packet for a new flow may get punted to a processor, i.e., processor n, violating the above defined policy. For example, the policy may require that flows from a particular source be assigned to a designated processor. If this is an unacceptable behavior, processor n, which in this case is not the designated processor, sends a reject message to the flow distribution unit and the newly received packet will now be punted to a processor determined through the defined policy for distributing new flows.

If the new flow is assigned to a different processor then the new flow will also cause a collision in the Bloom filters, i.e., a false positive from processor n and the true positive from the newly assigned processor, and hence the flow will be installed in the collision flow table. Also, a query is sent to the corresponding processor, processor n, that has collision with this flow. This processor may have one or multiple flows matching this hash and it installs these flows to the collision flow table. The collision flow table from then on maintains a set of colliding flows for this set of hashes.

In order to support removal of a flow from the Bloom filter of the flow distribution unit, each processor locally maintains a counting Bloom filter as its copy of the Bloom filter stored by the flow distribution unit. This procedure is depicted in the flow chart of FIG. 5. A counting Bloom filter maintains a count for how many times each bit is set. This count is an indication of how many different flows have set the particular bit in the Bloom filter. Once the indices for a new flow are known the new flow is installed in the counting Bloom filter by incrementing the bits indexed by the new flow. The current count for a bit in the counting Bloom filter denotes the number of flows producing the same hash index of that bit.

Figure 5:
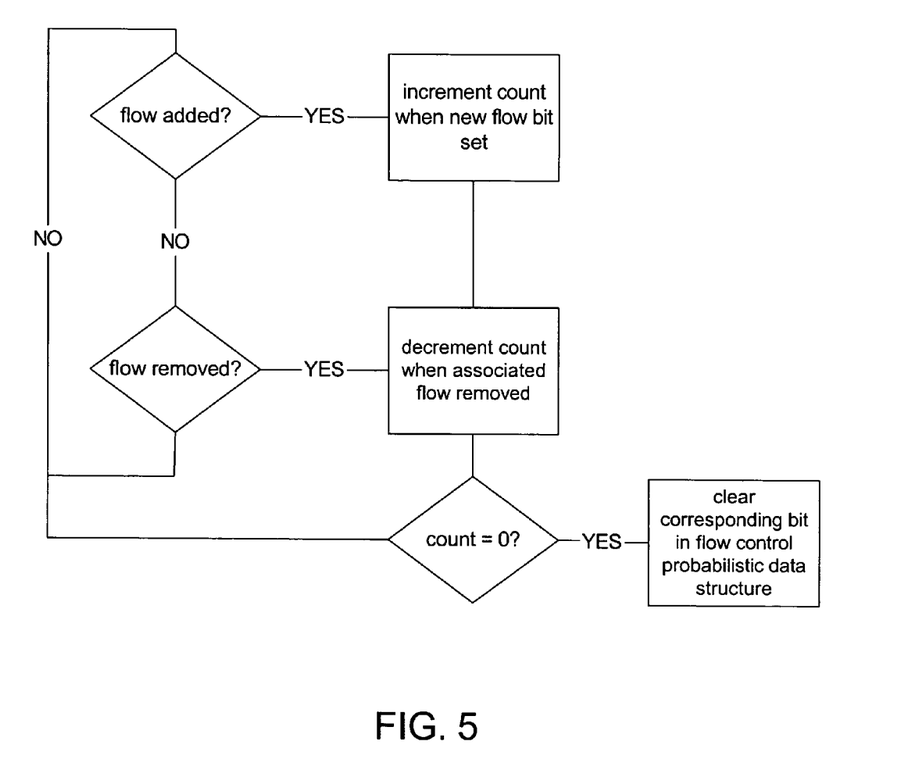
FIG. 5 is a flow chart depicting the steps of removing a flow in an embodiment of the invention.

The count for a bit is decremented when its corresponding flow is removed. However, the bit cannot be reset if the count is greater than zero because it is still part of the index set for other flows still being punted to the processor.

However, when the count reaches zero the bit is no longer part of the index set of the flows being punted to the processor. At this point the bit is cleared in both the counting Bloom filter maintained at the processor and the corresponding Bloom filter maintained at the flow distribution unit.

As described above, one problem with current hash-based flow distribution systems is that related flows may be punted to different processors because the hash algorithms are stateless. In the currently described embodiment related flows may be punted to the same processor because the hash results can be programmed into the stateful Bloom filter in advance of receiving a related flow.

For example, many protocols begin with a control flow to establish a connection followed by a data flow. In this case, the control flow would be punted to a first processor. Based on information in the packets of the control flow the hash values of the tuples of the data flow can be computed and installed in the Bloom filter of the first processor before any packets of the data flow are received. Accordingly, when a packet of the related data flow is received it will be punted to the first Bloom filter by the flow controller.

Accordingly, a mechanism of distributing flows has been described that is a flexible and fault tolerant solution for scaling performance of multiprocessor system consisting of ASIC, FPGA, Network Processors and General purpose processors. The scaling is achieved by distributing the load of a high speed link in real time onto concurrently operating independent processors in a flow preserving manner.

Other advantages of the mechanism are:
- Minimal inter-processor communication between multiple processors
- Low complexity
- Concept flexibility
- Fault tolerant
- Suitable for hardware implementation
- The memory requirement for collision flow table scales linearly with number of concurrent flows.

As is known in the art, the invention may be implemented in hardware and/or as program code, stored on a computer readable medium, that is executed by a digital computer. The computer readable medium may include, among other things, magnetic media, optical media, electromagnetic fields encoding digital information, and so on.

The invention has now been described with reference to the preferred embodiments. Alternatives and substitutions will now be apparent to persons of skill in the art. Accordingly, it is not intended to limit the invention except as provided by the appended claims.

What is claimed is:

1. A method for forwarding packets in a flow to an assigned processor in a multi-processor system, where each packet includes tuples indicating the source, destination, and other attributes of the packet and with a particular flow identified by a set of tuples having a specific value, said method comprising the steps of:
   - associating a flow control probabilistic data structure with each processor in the multi-processor system, with each flow control probabilistic data structure having a bit-vector of m bits with each bit identified by an index value, where m is an integer greater than zero;
   - applying k hash functions, where k is an integer greater than zero, to selected tuples of a received packet, to generate k values;
   - indicating a hit of a bit vector in a particular flow control probabilistic data structure if the bit values of the bit vector at k indices equal to the k values are asserted; and
   - directing the packet to a first processor associated with a flow control probabilistic data structure indicating a hit if only a single hit occurs or looking up the tuples of the received packet in a collision flow table if multiple hits occur, with the collision flow table storing tuples of flows that hit multiple flow control probabilistic data structures and indicating a processor assigned to flows stored in the collision flow table.

2. The method of claim 1 further comprising the steps of:
   - utilizing a standard load balancing algorithm to direct a received packet to a first processor if no probabilistic data structure is hit; and
   - asserting the bits having indices equal to the k values for the received packet in the bit vector of the flow control probabilistic data structure associated with the first processor.

3. The method of claim 1 further comprising the steps of:
   - rejecting a first received packet routed to a first processor in error; and
   - utilizing a standard load balancing algorithm to direct the first packet to a second processor.

4. The method of claim 3 further comprising the steps of:
   - installing the tuples of the first packet in the collision flow table if the standard load balancing algorithm routes the first packet to a second processor; and
   - querying the first processor for other flows that collide with the first packet; and
   - installing the tuples of the other flows in the collision flow table.

5. The method of claim 4 further comprising the step of:
   - asserting the bits having indices equal to the k values for the first received packet in the bit vector of the flow control probabilistic data structure associated with the second processor.

6. The method of claim 1 further comprising the steps of:
   - maintaining a counting probabilistic data structure at a first processor;
   - maintaining a count value indicating the number of times a particular bit in the counting probabilistic data structure is set to indicate how many flows have set the particular bit in the counting probabilistic data structure;
   - decrementing the count value the particular bit each time a flow which set the particular bit is removed;
   - clearing the particular bit in the counting probabilistic data structure associated with the first processor when the count value is zero to remove a flow from the flow control probabilistic data structure.

7. The method of claim 6 further comprising the steps of:
   - identifying a second flow related to a first received flow;
   - assigning the first flow to a designated processor;
   - preinstalling a hash result for the second flow in the flow control probabilistic data structure associated with the designated processor.

8. A system for forwarding packets in a flow to an assigned processor in a multi-processor system, where each packet includes tuples indicating the source, destination, and other attributes of the packet and with a particular flow identified by a set of tuples having a specific value, said system comprising:
   - means for associating a flow control probabilistic data structure with each processor in the multi-processor system, with each flow control probabilistic data structure having a bit-vector of m bits with each bit identified by an index value, where m is an integer greater than zero;

means for applying k hash functions, where k is an integer greater than zero, to selected tuples of a received packet, to generate k values;

means for indicating a hit of a bit vector in a particular flow control probabilistic data structure if the bit values of the bit vector at k indices equal to the k values are asserted; and means for directing the packet to a first processor associated with a flow control probabilistic data structure indicating a hit if only a single hit occurs or looking up the tuples of the received packet in a collision flow table if multiple hits occur, with the collision flow table storing tuples of flows that hit multiple flow control probabilistic data structures and indicating a processor assigned to flows stored in the collision flow table.

9. The system of claim 8 further comprising:

means for utilizing a standard load balancing algorithm to direct a received packet to a first processor if no flow control probabilistic data structure is hit; and means for asserting the bits having indices equal to the k values for the received packet in the bit vector of the flow control probabilistic data structure associated with the first processor.

10. The system of claim 8 further comprising:

means for rejecting a first received packet routed to a first processor in error; and means for utilizing a standard load balancing algorithm to direct the first packet to a second processor.

11. The system of claim 10 further comprising:

means for installing the tuples of the first packet in the collision flow table if the standard load balancing algorithm routes the first packet to a second processor; and means for querying the first processor for other flows that collide with the first packet; and means for installing the tuples of the other flows in the collision flow table.

12. The system of claim 11 further comprising:

means for asserting the bits having indices equal to the k values for the first received packet in the bit vector of the flow control probabilistic data structure associated with the second processor.

13. The system of claim 8 further comprising:

means for maintaining a counting probabilistic data structure at a first processor;

means for maintaining a count value indicating the number of times a particular bit in the counting probabilistic data structure is set to indicate how many flows have set the particular bit in the counting probabilistic data structure;

means for decrementing the count value for the particular bit each time a flow which set the particular bit is removed;

means for clearing the particular bit in the counting probabilistic data structure associated with the first processor when the count value is zero to remove a flow from the flow control probabilistic data structure.

14. The system of claim 8 further comprising:

means for identifying a second flow related to a first received flow;

means for assigning the first flow to a designated processor;

means for preinstalling a hash result for the second flow in the flow control probabilistic data structure associated with the designated processor.

15. One or more computer-readable media encoded with software comprising computer executable instructions and when executed operable to:

associate a flow control probabilistic data structure with each processor in a multi-processor system, with each flow control probabilistic data structure having a bit-vector of m bits with each bit identified by an index value, where m is an integer greater than zero;

apply k hash functions, where k is an integer greater than zero, to selected tuples of a received packet, to generate k values;

indicate a hit of a bit vector in a particular flow control probabilistic data structure if the bit values of the bit vector at k indices equal to the k values are asserted; and direct the packet to a first processor associated with a flow control probabilistic data structure indicating a hit if only a single hit occurs or looking up the tuples of the received packet in a collision flow table if multiple hits occur, with the collision flow table storing tuples of flows that hit multiple probabilistic data structures and indicating a processor assigned to flows stored in the collision flow table.

16. The one or more computer readable media of claim 15 encoded with software comprising computer executable instructions and when executed further operable to:

utilize a standard load balancing algorithm to direct a received packet to a first processor if no probabilistic data structure is hit; and assert the bits having indices equal to the k values for the received packet in the bit vector of the flow control probabilistic data structure associated with the first processor.

17. The one or more computer readable media of claim 15 encoded with software comprising computer executable instructions and when executed further operable to:

reject a first received packet routed to a first processor in error; and utilize a standard load balancing algorithm to direct the first packet to a second processor.

18. The one or more computer readable media of claim 17 encoded with software comprising computer executable instructions and when executed further operable to:

install the tuples of the first packet in the collision flow table if the standard load balancing algorithm routes the first packet to a second processor;

query the first processor for other flows that collide with the first packet; and install the tuples of the other flows in the collision flow table.

19. The one or more computer readable media of claim 18 encoded with software comprising computer executable instructions and when executed further operable to:

assert the bits having indices equal to the k values for the first received packet in the bit vector of the flow control probabilistic data structure associated with the second processor.

20. The one or more computer readable media of claim 15 encoded with software comprising computer executable instructions and when executed further operable to:

maintain a counting probabilistic data structure at a first processor;

maintain a count value indicating the number of times a particular bit in the counting probabilistic data structure is set to indicate how many flows have set the particular bit in the counting probabilistic data structure;

decrement the count value for the particular bit each time a flow which set the particular bet is removed; and clear the particular bit in the counting probabilistic data structure associated with the first processor when the count value is zero to remove a flow from the flow control probabilistic data structure.

21. The one or more computer readable media of claim 15 encoded with software comprising computer executable instructions and when executed further operable to:

identify a second flow related to a first received flow;

assign the first flow to a designated processor;

preinstall a hash result for the second flow in the flow control probabilistic data structure associated with the designated processor.

22. A system for forwarding packets in a flow to an assigned processor in a multi-processor system, where each packet includes tuples indicating the source, destination, and other attributes of the packet and with a particular flow identified by a set of tuples having a specific value, said system comprising:

a plurality of processors;

a flow controller, coupled to the plurality of processors, including a memory for storing flow control probabilistic data structures and a collision flow table, each flow control probabilistic data structure having a bit-vector of m bits with each bit identified by an index value, where m is an integer greater than zero, and a processor configured to apply k hash functions, where k is an integer greater than zero, to selected tuples of a received packet, to generate k values, where, if a flow is a new flow, to assert the bits having indices equal to the k values for the received packet in the bit vector of the flow control probabilistic data structure associated with a first processor or, if the flow has previously been received, to indicate a hit of a bit vector in a particular flow control probabilistic data structure if the bit values of the bit vector at k indices equal to the k values are asserted, and to direct the packet to the first processor associated with a flow control probabilistic data structure indicating a hit if only a single hit occurs, or to store tuples of flows that hit multiple flow control probabilistic data structures in the collision flow table and to look up the tuples of the received packet in the collision flow table if multiple hits occur.

* * * * *